Oct. 23, 1962 W. JACKSON, JR., ET AL 3,059,891
APPARATUS FOR ALTERING PRESSURE IN VESSELS
Filed Dec. 30, 1957

INVENTORS
WARREN JACKSON, JR. &
RICHARD H. JONES
BY
*Leland P. Chapman*
ATTORNEY United States Patent Office 3,059,891
Patented Oct. 23, 1962

3,059,891
APPARATUS FOR ALTERING PRESSURE
IN VESSELS
Warren Jackson, Jr., Lyndhurst, and Richard H. Jones, South Euclid, Ohio, assignors to The Standard Oil Company, Cleveland, Ohio, a corporation of Ohio
Filed Dec. 30, 1957, Ser. No. 706,133
1 Claim. (Cl. 251—26)

This invention relates to apparatus for altering pressure in a reaction vessel by regulating the flow of gases out of or into the vessel at a near constant rate not exceeding but approximating a maximum allowable flow rate so that said change in pressure will be effected within a near optimum time consistent with said fixed maximum flow rate.

In particular, this invention relates to a lag network system comprising a series of orifice and surge tank combinations connected in series with a valve disposed within an outlet or inlet line to a reaction vessel so as to open said valve in a manner to achieve a near constant flow rate of gases slightly lower than a maximum allowable flow rate.

It is quite common today in the chemical processing and petroleum industries to have autoclaves and reactors filled at the end of batch operations with gases at super atmospheric pressures. In many such instances, it is necessary to discharge or vent these gases from such a reaction vessel before the vessel is recharged for a new operating cycle. Furthermore, due to particular circumstances attendant to the process, this depressurization often must be accomplished so as not to exceed a certain flow rate of gas.

Such restrictive conditions, for example, must be met when depressurizing a catalytic reforming reactor, a unit which is present in nearly all modern petroleum refineries. In such a reactor expensive catalyst is supported on a fixed bed within the reactor, and at the end of a reaction cycle gases are present in the reactor at temperatures of 600–1000° F. and pressures in the range of 150 to 600 p.s.i.a. Should gases under such conditions be vented by means of a conventional valve to atmospheric pressure, the initial flow rate would be at such high levels as to severely agitate the catalyst in the bed and thereby cause material damage to catalyst, which normally must be used in many subsequent cycles to make the operation economical, as well as damage to internals in the reactor, such as screens, supports, etc. Similar considerations apply in introducing gas into such a reactor.

Therefore, it often becomes necessary to limit the flow of the high pressure gases out of or into a reaction vessel to a safe maximum rate. For example, when venting a closed vessel containing gases under high pressures, perhaps the simplest device is a fixed orifice-type valve where the size of the orifice is selected to vent gas within the specified maximum flow rate when the gases are at their maximum pressure or in effect when the valve is initially opened. Such a device and similar devices which merely control the peak flow rate from the vessel to within the maximum flow rate exhibit the inherent disadvantage that as the pressure within the reactor decreases, the flow rate decreases proportionately. Therefore, in order to depressurize the reactor to atmospheric pressures, a great amount of time is consumed, adversely affecting the economics of operation. While it is possible to insert several valves in parallel and open the second valve after the pressure drops part way, this structure has the inherent danger that an inexperienced person may open both valves with resultant damage to the catalyst and said internals.

It is readily obvious, therefore, that if pressure must be altered within a reaction vessel by the flow of gases maintained within a maximum allowable flow rate, the quickest and most economical means is to regulate the flow of gases at a constant rate approximating the maximum allowable flow rate. One way of accomplishing this is to "crack" the valve controlling the flow of gases and watch a flowmeter, while gradually opening the valve to maintain a constant flow. This structure is also attended with dangers in that an inexperienced person may "crack" open the valve too much initially with resultant damage to the catalyst and said internals.

Therefore, it is the object of our invention to provide a lag network system for altering pressure to a control valve associated with a reactor so that the flow rate of gases from said reactor is limited to or is maintained slightly less than an allowable maximum flow rate and said flow rate of gases continues at nearly a constant rate so that the desired change in pressure in the reactor is attained in the shortest time permissible consistent with the specified maximum flow rate.

It is a further aim of this invention to provide a control means for altering pressure in a reactor, utilizing inexpensive and conventional equipment which is easily fabricated and installed for any particular reactor and which is readily adaptable to modification to accommodate a required change in reactor conditions.

It is a further objective of this invention to provide a lag network system of depressurizing vessels which once initiated will continue automatically until complete depressurization is accomplished, guarding against the possibility of exceeding the maximum allowable flow rate through equipment failure or operator error.

It is a further objective of this invention to provide a control system for filling a reactor with gases from a closed high pressure vessel at a constant flow rate not exceeding but approximating a maximum allowable flow rate imposed for the reactor.

It is an additional object of our invention to provide control means which will be "fail safe"; i.e., if it gets out of order for any reason, the valve controlling the flow of gases will remain closed so as not to damage the catalyst and said internals in a reaction vessel.

Although the lag network system of this invention has been previously discussed in relation to depressurization of a closed vessel under high pressures in an optimum time factor with a maximum allowable flow rate imposed as a condition for the vessel, as well as for filling a reactor from a closed high pressure vessel connected to said reactor where a maximum allowable flow rate must be observed in filling the reactor to prevent damage of catalyst or internals within the reactor, for the sake of simplicity, however, the following detailed description and example of operation and the accompanying drawings are limited to a case where a high pressure reactor is depressurized to near atmospheric pressure. In the drawings (drawn not to scale):

FIGURES 3, 4 and 5 are graphs showing the operation of the specific illustrative embodiment and in which FIGURE 3 is a graph expressing the relation of the opening of the depressurizing valve to the time of valve operation;

FIGURE 4 is a graph expressing the relation of the reactor pressure to the time of valve operation; and FIGURE 5 is a graph expressing the relation of the flow rate to the time of valve operation.

Figure 1:
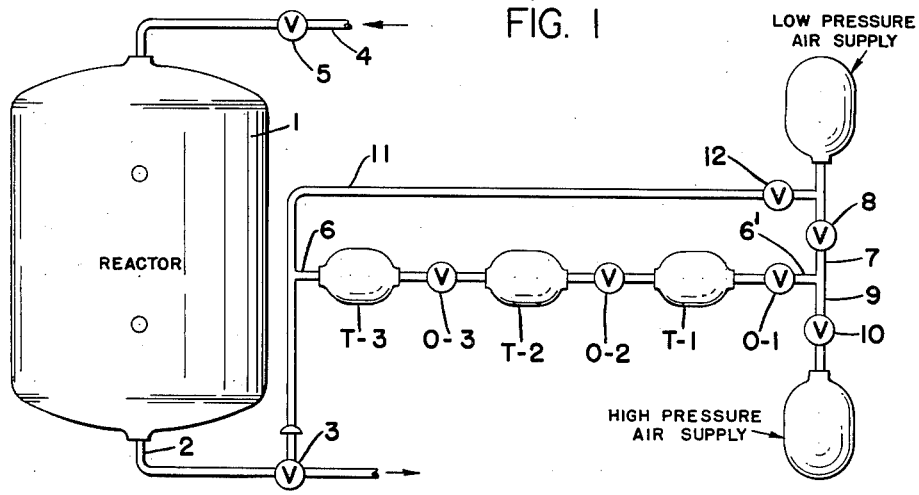
FIGURE 1 is a schematic sketch of a lag network system for controlling depressurization of a reactor filled with gases under a high pressure.

Referring to FIGURE 1, reactor 1 filled with gases under high pressure has inlet conduit 4 with valve 5 disposed therein and outlet conduit 2 with depressurizing control valve 3 disposed therein. Control valve 3 is an air-operated, diaphragm-type valve. Air pressure is applied to one side of the diaphragm through conduit 6. Valve 3 is a reverse-acting valve in that an increase in air pressure will compress the diaphragm mechanism and cause the valve to open, thereby venting gas from reactor 1. If air pressure should fail for any reason, the valve will close, i.e., will "fail safe." Surge tanks T-1, T-2, T-3 and orifices O-1, O-2, O-3 are located in conduit 6 as shown, and each orifice and surge tank combination is indicated by the same subscript numeral. The orifices may conveniently be needle valves.

The conduit 6 communicates through the surge tanks and orifices disposed alternately in series as T-3, O-3, T-2, O-2, and T-1, O-1 to a continuation of the conduit 6' which is joined by two conduits 7 and 9. Conduit 7 is connected through valve 8 with a low pressure air supply, and conduit 9 is connected through a higher pressure air supply through valve 10. By-pass conduit 11 in which valve 12 is disposed connects conduit 6 to conduit 8 in the manner sown. For most commercial forms of the valve 3, the low pressure source will be about 3 p.s.i.g. and the high pressure source will be about 15 p.s.i.g. When valve 10 is closed and valve 8 is open, 3 p.s.i.g. will be applied to the diaphragm of valve 3. While this is less than the pressure which will cause the valve 3 to open, preloading the valve to the extent indicated minimizes the time required to establish a pressure which will open the valve. When valves 8 and 12 are closed and valve 10 is open, air from the 15 p.s.i.g. source will flow through conduits 9, 6' and orifice O-1 and gradually build up pressure in surge tank T-1. As pressure starts to build up in surge tank T-1, air will flow through orifice O-2 and start to build up pressure in surge tank T-2 and thereafter air will start to flow through orifice O-3 and build up pressure in surge tank T-3. As the pressure in surge tank T-3 builds up above 3 p.s.i.g., this pressure will be transmitted through conduit 6 and begin to open the valve 3. The extent to which the valve stem in the valve 3 travels, and the extent to which the valve opens, is proportional to increase in pressure in conduit 6.

Figure 2:
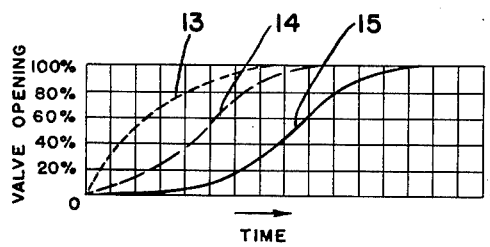
FIGURE 2 is a graph showing the relation of the opening of the depressurizing valve to time, under theoretical conditions, for the purpose of facilitating an understanding of the mode of operation of the device.

Referring to FIGURE 2, the curve 13 shows the relation of the valve opening to time if there were only one orifice and one surge tank in the conduits 6, 6'. This curve has an exponential form. Since the initial opening must be more gradual than shown on the curve 13, one orifice and surge tank combination is not sufficient. When there are two orifice and surge tank combinations, the curve is more flat at the beginning and gives some "dead time" effect at the beginning of the operation as shown in curve 14. The more orifice and surge tank combinations, the more flat the curve will be at the beginning. Thus, four orifice and surge tank combinations will give a curve of the general shape of curve 15. Any number of orifices and surge tank combinations may be connected in series as shown, provided there are at least two. The number will depend upon the general shape of the valve opening curve desired.

The surge tanks need not all be the same in size. If the first tank T-1 is very small and approaches zero, the effect is to have two orifices O-1, O-2 in series, which has the ultimate effect of a single orifice ahead of surge tank T-2. If the first surge tank is made very large relative to the other two, it tends to eliminate the effect of the other two. The ideal situation is to have the surge tanks all the same size but, practically, they may vary from each other as much as 50%, and this may be desirable from a construction standpoint where the surge tanks may be fitted into appropriate space requirements.

The size of the surge tanks is not critical. The smaller they are, the smaller must be the orifices; however, if the orifices are too small, there is the danger of clogging with impurities in the air stream and for that reason the surge tanks may be from 100 cubic inches upwards. There is no theoretical upper limit, but there is no advantage to a volume of over 5 cubic feet.

In the preferred embodiment of the apparatus, the orifices O-1, O-2, O-3 are needle valves which can be adjusted to the proper opening. The size of the orifices or the adjustments of the needle valves is such that the proper pressure can build up in each surge tank in the required time so as to control the valve 3 in such a manner that the flow rate is constant. The desired size of the orifices can be readily determined by calculation, as will be obvious to one skilled in the art. The amount of gas in the reactor in any instance is always known and the maximum flow rate is always known. Therefore, the minimum time in which the reactor can be emptied of the gas can readily be calculated. Since it is difficult to achieve in practice that which is theoretically possible, the device is usually programmed for a longer time. If an operator chooses not to use calculations for the optimum setting of the orifices, they may be set by rule of thumb in the following manner.

If there are to be two tanks and two orifices in the lag system, orifice O-1 and tank T-1 are adjusted as an independent combination so that approximately 50% of the pressure in the high pressure supply line builds up in tank T-1 in approximately half the programmed time. Orifice O-2 and tank T-2 are then adjusted as an independent combination so that approximately 50% of the pressure in the high pressure supply line builds up in tank T-2 in approximately the remaining half of the programmed time. Orifice and tank combination O-1, T-1 and orifice and tank combination O-2, T-2 are then connected in series in the conduit 6, providing the lag system for control valve 3.

If there are to be three orifices and three tanks in the lag system, each orifice and tank combination; O-1 T-1, O-2 T-2, O-3 T-3; is adjusted independently so that approximately two-thirds of the pressure from the high pressure supply line builds up in the tank in approximately one-third of the time. The three orifice and tank combinations are then connected in series in the conduit 6, providing the lag system for valve 3.

If there are to be four orifices and four tanks in the lag system, then each orifice and tank combination— O-1 T-1, O-2 T-2, O-3 T-3, O-4 T-4—is adapted independently so that approximately three-fourths of the pressure from the high pressure supply line builds up in the tank in approximately one-fourth of the time, etc.

The following is illustrative of a specific example:

The catalytic reformer 1 with valves 5 and 3 closed has a volume of 552 cubic feet and contains gases at a temperature of 800° F. and a pressure of 365 p.s.i.a. or a total of 464 pounds of gas. Conduit 2 vents to atmospheric pressure or to a flare as valve 3 is opened. Under these conditions it is desired to depressurize the reactor 1 down to 20 p.s.i.a., limiting the maximum flow rate to 1.05 pounds of gas per second. This would require about 7½ minutes theoretically; but since it is usually impossible to do as well practically, a somewhat longer time of 9 minutes is selected as the depressurizing time. To accomplish this, valves 8 and 12 are closed and valve 10 is opened so that the 15 p.s.i.g. air is enabled to communicate with the control valve 3 by means of the conduit 6', the series network of orifice and surge tank combinations O-1, T-1; O-2, T-2; O-3, T-3, and conduit 6. Orifices O-1, O-2, O-3 are needle valves and surge tanks T-1, T-2, T-3 have volumes of 1000 cubic inches each. Each orifice and tank combination is adjusted in the manner previously described for a lag system containing three orifices and three surge tanks so that orifice O-1 and surge tank T-1 are adjusted as an independent combination wherein 67% of the high pressure air supplied or 10 p.s.i.g. builds up in tank T-1 in three minutes. In like manner, orifice O–2 and tank T–2 are independently adjusted as a combination so that 67% of the high pressure air supplied builds up in tank T–2 in three minutes, and orifice O–3 and surge tank T–3 are independently adjusted as a combination so that 67% of the high pressure air supplied builds up in surge tank T–3 in three minutes.

After reactor 1 has been despressurized down to 20 p.s.i.a. in accordance with the programming set forth in the specific example, valve 10 is closed and valve 12 is opened. The 15 p.s.i.g. pressure signal on valve 3 will therefore drop rapidly into equalization with the 3 p.s.i.g. pressure signal of the low pressure air supply by means of the by-pass conduit 11 and valve 3 will close. Valve 12 is then closed and valve 8 is opened, whereupon the valve 3 remains closed and the depressurization cycle is complete.

Of course, if it is desired to depressurize the reactor 1 to some other level intermediate between the high pressure of the closed reactor and atmospheric pressure, the valve 3 may be closed when the desired pressure is reached by opening valve 12 and closing valve 10 as explained above. As will be obvious to those skilled in the art, this same valve operation may be used when filling a reactor from a closed high pressure vessel to attain the desired pressure level within the reactor.

Figure 3:
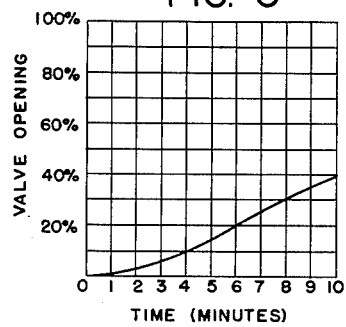
Figure 4:
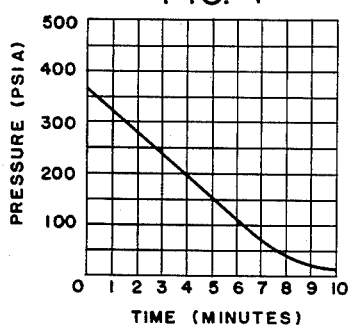
Figure 5:
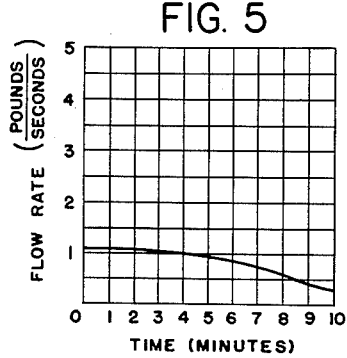

FIGURES 3, 4, and 5 show the effect of the operation of the valve 3 over a 9-minute depressurizing period of the above specific example.

More particularly, FIGURE 3 shows the valve opening (the valve stem travel) during the 9 minutes required for depressurization. It will be seen that during the first minute of operation, the valve opens very slightly and as the time goes on, the valve opens more until near the end of the period its opening is almost a straight line function of the time.

FIGURE 4 shows the pressure in the reactor over a period of time showing that the pressure drops almost linearly during the first 7 minutes and then continues to drop down to 20 p.s.i.a. at 9 minutes (5 p.s.i.g.) and continues to drop further after that.

FIGURE 5 shows that the flow rate is fairly constant with the maximum value near the beginning of the operation and always below the maximum allowable rate of 1.05 pounds of gas per hour.

The above depressurizing cycle is to be contrasted with the depressurization by means of a single valve which is set for the maximum allowable flow rate at the beginning of the operation. In such a depressurizing method, a total of 21 minutes elapses before the pressure reaches 5 p.s.i.g.

The network system shown can be easily adapted and adjusted to any change of conditions, considering the pressure in the reactor, the amount of gas, and permissible flow rates, in view of the explanation given heretofore.

We claim:

In a control system for altering pressure in a vessel at a nearly constant rate, a gas pressure responsive valve designed to move from a normally closed position to an open position as a function of increased pressure applied thereto, means providing a gradualy increase in gas pressure to said valve comprising in combination, a serial arrangement of interconnected orifices and surge tanks alternately disposed with respect to each other, one end of the series terminating in a surge tank and the other end terminating in an orifice, an independent external source of low pressure gas, an independent external source of high pressure gas, valved conduit means connecting each of said gas pressure sources to the orifice end of said serial arrangement, the connections being such that either source may be shut off from said serial arrangement while the other source is in communication therewith, means connecting said pressure responsive valve with the surge tank end of said serial arrangement, said low pressure source being of such magnitude that when said low pressure source is in communication with said serial arrangement, said pressure responsive valve remains closed, and when said high pressure source is in communication with said serial arrangements, said pressure responsive valve opens gradually.

References Cited in the file of this patent

UNITED STATES PATENTS

| | | |
|---|---|---|
| 1,584,407 | Thomas | May 11, 1926 |
| 2,000,002 | Stockmeyer | Apr. 30, 1935 |
| 2,456,403 | Goehring | Dec. 14, 1948 |
| 2,579,334 | Plank | Dec. 18, 1951 |
| 2,709,450 | Holm | May 31, 1955 |
| 2,805,038 | Towler | Sept. 3, 1957 |
| 2,865,592 | Schrank | Dec. 23, 1958 |